United States Patent
Payette-Hebert et al.

(10) Patent No.: US 7,722,357 B2
(45) Date of Patent: May 25, 2010

(54) EDUCATIONAL PILLOW CASE

(75) Inventors: Marie Payette-Hebert, Montreal (CA);
Lyne Noiseux, 120 de Bastogne, McMasterville, Quebec (CA) J3G 5J2

(73) Assignee: Lyne Noiseux, McMasterville, Quebec (CA)

( * ) Notice: Subject to any disclaimer, the term of this patent is extended or adjusted under 35 U.S.C. 154(b) by 1001 days.

(21) Appl. No.: 11/403,688

(22) Filed: Apr. 13, 2006

(65) Prior Publication Data
US 2007/0264900 A1    Nov. 15, 2007

(51) Int. Cl.
*G09B 19/00*   (2006.01)

(52) U.S. Cl. .................................... 434/236

(58) Field of Classification Search ............. 434/81, 434/156, 236, 238, 365; 5/639; D6/601
See application file for complete search history.

(56) References Cited

U.S. PATENT DOCUMENTS

| | | | |
|---|---|---|---|
| 1,926,139 A | | 9/1933 | Browne |
| 3,274,623 A | * | 9/1966 | McCarthy ...................... 5/485 |
| 3,281,966 A | | 11/1966 | Johnson |
| 3,782,009 A | * | 1/1974 | Darnell ........................ 434/238 |
| 3,789,546 A | * | 2/1974 | Morrison ...................... 446/327 |
| 4,309,784 A | * | 1/1982 | Cohen ........................... 5/639 |
| 4,776,799 A | * | 10/1988 | Walsh .......................... 434/238 |
| 4,853,994 A | | 8/1989 | Ekstein |
| 4,917,607 A | | 4/1990 | Van Hoose |
| 5,372,509 A | | 12/1994 | Brocate et al. |
| 5,405,266 A | | 4/1995 | Frank et al. |
| 5,778,468 A | * | 7/1998 | Saarela et al. ................... 5/636 |
| D397,902 S | * | 9/1998 | Knorrek ...................... D6/601 |
| 5,954,512 A | * | 9/1999 | Fruge .......................... 434/238 |
| 6,267,638 B1 | * | 7/2001 | Connolly et al. ............... 446/73 |
| 6,434,769 B1 | * | 8/2002 | Koenig .......................... 5/636 |
| D476,184 S | * | 6/2003 | Hall ............................ D6/601 |
| 6,572,380 B1 | * | 6/2003 | Buckley et al. ............. 434/238 |
| D485,723 S | * | 1/2004 | Salazar ........................ D6/601 |
| 6,820,582 B1 | * | 11/2004 | Gabriel et al. ........... 123/193.6 |
| 7,182,601 B2 | * | 2/2007 | Donnan ....................... 434/236 |
| 7,461,421 B1 | * | 12/2008 | Faircloth et al. ............... 5/639 |

* cited by examiner

*Primary Examiner*—Kurt Fernstrom
(74) *Attorney, Agent, or Firm*—Collard & Roe, P.C.

(57) ABSTRACT

The present invention provides an apparatus and method concerning an educational pillow case. The pillow case comprises an interior surface and an exterior surface, the interior surface providing at least one room for casing a pillow and the exterior surface having a shape of a stuffed toy. The pillow case also comprises a plurality of pockets for carrying objects. At least one of the plurality of pockets is located on the exterior surface and displays objects and at least another of the plurality of pockets is located on the interior surface. The pillow case of the present invention further comprises a plurality of sets of detachable pieces. At least one of the plurality of pockets and at least one set of detachable pieces enable receiving information for the program for raising children. The objects include messages, or objectives, or incentives, or rewards, or a combination thereof. The at least one set of detachable pieces is arranged for exposing and updating information on an evolution of a behavior.

7 Claims, 4 Drawing Sheets

EDUCATIONAL PILLOW CASE

FIELD OF THE INVENTION

The present invention relates to the field of teaching tools. The present invention more particularly provides an apparatus and method concerning an educational pillow case.

BACKGROUND OF THE INVENTION

Communication in general has become an important issue and many researches are directed to programs for improving communication between people, for example between parents and children, teachers and children, among children, employers and employees, or among doctors and patients.

It is not always easy for a parent caught in the every day routine to notice and understand the emotions of their children, or establish a long term program to teach their children discipline or any other value. Communication between a parent and child has become an even more worrying issue than communication among people in general, especially knowing that the parents do not always spend as much time as they would like to with their children, and knowing that according to many parents, raising children involves attention and consistency.

U.S. Pat. No. 4,917,607 (Van Hoose) discloses a rag doll comprising detachable pieces for facilitating therapeutic communication between a therapist and a patient. U.S. Pat. No. 5,405,266 (Frank et al.) also discloses a psychotherapeutic doll provided with multiple interchangeable faces for portraying emotions and other accessories such as pockets tied with elastics. U.S. Pat. No. 1,926,139 (Browne) discloses a doll with removable head coverings to facilitate educating and following changes in a child's behaviour.

U.S. Pat. No. 5,372,509 (Brocato et al.) discloses a figure-type play and reward kit for helping a child to distinguish between good things and bad things, using messages on stickers. U.S. Pat. No. 3,281,966 (Johnson) also discloses a figure enabling employers to evaluate employees and posting slogans directed to the employees on the figure.

U.S. Pat. No. 4,853,994 (Ekstein) discloses a pillow book comprising removable figurines laid in a pocket of the pillow book.

Despite all the tools provided in the prior art, parents still need a system as practical and close as a pillowcase, as child-friendly as a stuffed animal, and a system plainly using simple ways to communicate with a child.

Some of the above mentioned patents disclose a toy involved in therapeutic programs but none of the known systems disclose an apparatus supporting an educational program providing predetermined areas for exchanging messages, following up, getting feedback and rewarding. Furthermore, the teachings of Van Hoose are adapted and directed to sick children. Therefore these teachings do not address the need of any parent and child in good health willing to maintain a good relationship with their children.

Another need unfulfilled by the prior art concerns follow-ups. There is a need for a system that also allows keeping and displaying record of the evolution of a child's behaviour.

SUMMARY OF THE INVENTION

It is therefore an object of the present invention to provide a pillow case and method for using such pillow case for enhancing a program for raising children.

According to one aspect of the invention, the pillow case comprises:

an interior surface and an exterior surface, the interior surface providing at least one room for casing a pillow and the exterior surface having a shape of a stuffed toy;

a plurality of pockets for carrying objects, at least one of the plurality of pockets being located on the exterior surface and enabling the display of the objects, and at least another of the plurality of pockets being located on the interior surface; and a plurality of sets of detachable pieces; and wherein at least one of the plurality of pockets, and at least one set of detachable pieces enable receiving information for the program for raising children, whereby the objects include messages, or objectives, or incentives, or rewards, or a combination thereof, and whereby the at least one set of detachable pieces is arranged for exposing and updating information on an evolution of a behavior.

According to another aspect of the invention the method comprises the steps of:

providing a pillow case comprising an interior surface, and an exterior surface, and a plurality of pockets, and a plurality of sets of detachable pieces, said interior surface providing at least one room for casing a pillow and said exterior surface having a shape of a stuffed toy, and wherein at least one of the plurality of pockets, and at least one set of detachable pieces carry information for a program for raising children;

using the plurality of pockets for carrying objects, at least one of the plurality of pockets being located on the exterior surface and enabling the display of the objects, and at least another of the plurality of pockets being located on the interior surface, and whereby the objects include messages, or objectives, or incentives, or rewards, or a combination thereof; and using the at least one set of detachable pieces for exposing and updating information on an evolution of a behavior.

These and other aspects of the invention will be become more apparent upon reading the detailed description and upon referring to the following drawings.

DESCRIPTION OF A PREFERRED EMBODIMENT

Figure 1:
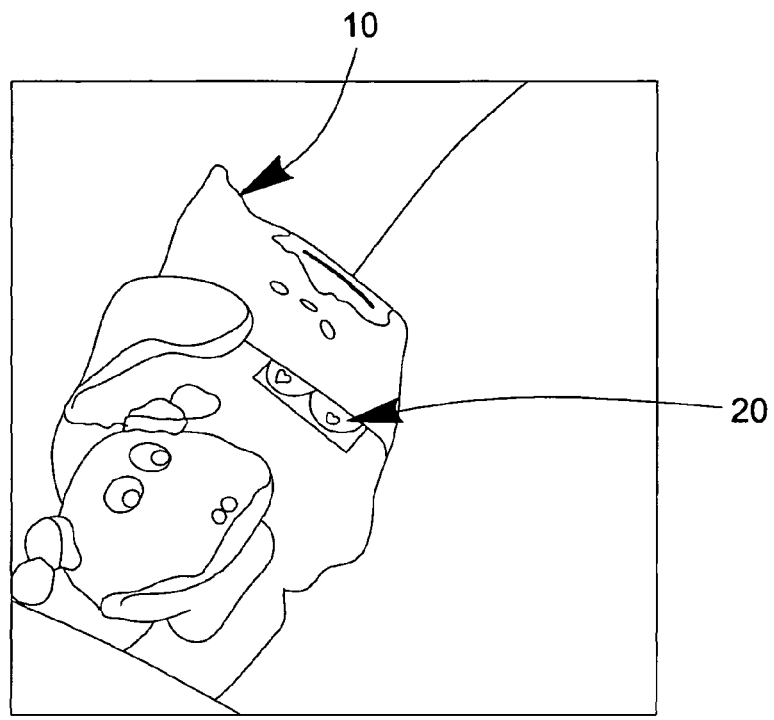
FIG. 1 is a perspective view of the pillow case according to a preferred embodiment of the invention.
Figure 2:
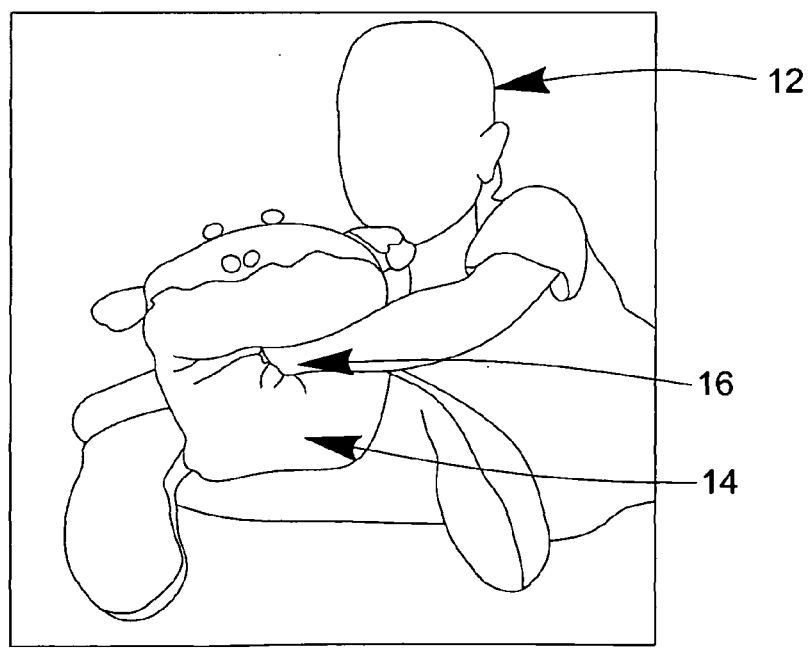
FIG. 2 is a perspective view of the pillow case of FIG. 1 held by a child.
Figure 3:
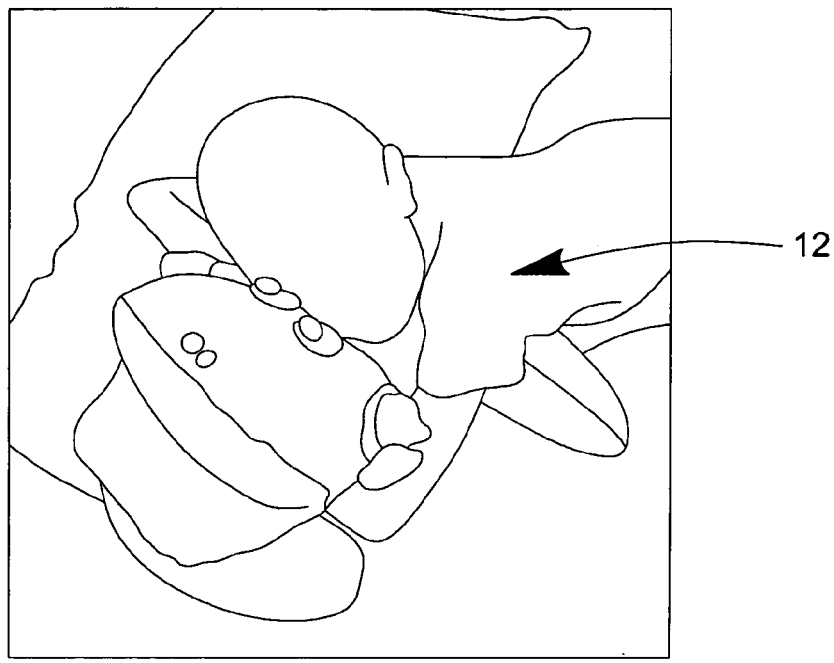
FIG. 3 is another perspective view of the pillow case of FIG. 1 held by a child.

Referring to FIGS. 1 to 3, there is provided a pillow case (10) having a child-friendly appearance, for example the appearance of a cuddly or soft toy such as a stuffed animal. More particularly, the pillowcase (10) comprises an interior surface and an exterior surface. The interior surface provides at least one room for casing a pillow. This interior surface is preferably shaped to receive a rectangular pillow. The exterior surface has a shape of a stuffed toy.

In the following description and according to the present embodiment, the pillow case (10) has the appearance of a stuffed animal and is referred to as a pillow case (10) or as a stuffed animal. The pillow case (10) has the appearance of a soft toy, in order to comfort and reassure children (12). In accordance with the present embodiment, it is also possible to name the pillow case (10) with a name that is likely to become familiar for the child (12). It will also be noted that the present invention constitutes a tool for a parent and child communication. This pillow case (10) helps parents in teaching values to their children (12) between about 6 and 8 years old.

The pillow case (10) also comprises a plurality of pockets (16) for carrying objects. The objects include messages, or objectives, or incentives, or rewards, or a combination thereof. At least one of the plurality of pockets (16) is located on the exterior surface and enabling the display of the objects and at least another of the plurality of pockets (16) is located on the interior surface.

Referring to FIG. 1, there is shown one of the main pockets (16) of the pillow case (10). This pocket is on the top (20) and covers about half of the space of the pillow case (10) and enables hiding or placing messages, drawings, rewards and object of the like. When these objects are removed from the mouth, these objects are preferably placed in the pocket on the top (20). When the pillow case is fully stuffed with a pillow or a soft stuffing of the like then the pillow case is extended which prevents the objects from falling out of the pockets (16).

Referring to FIG. 2, the mouth (14) of the stuffed animal is also a pocket (16), which can be compared to a mail box pertaining to the enhancement of the program according to the present invention. Any new rewards message or drawing, which a parent is willing to transmit to their child (12), is preferably placed in the mouth. The size of the mouth (14) opening is preferably adjusted, depending on the size of the gifts a parent is willing to transmit to his child. For example, if the parent tends to ban rewards of big sizes, it is possible to narrow the opening of the mouth of the animal. Thus, it is also possible for such parents to encourage privileges and permissions inscribed on papers rather than material rewards such as gifts.

The pillow case (10) according to the present invention can be either used as a conventional pillow case or as a communication tool between a parent and a child, or as a communication tool among children. Considering that parents have already clearly identify the objectives they are willing to reach regarding their child (12) behavior, the pillow case (10) according to the present invention enable them to deposit and pick up messages and give rewards using predetermined pockets (16). It is important to mention that the present pillow case is designed for all children between about 6 and 8 years old and is not particularly intended for children with special needs. A person skilled in the art will understand that various adaptations can be made to the present invention to match the child interest or level.

Referring to FIG. 3, there is shown a child (12) using the pillow case (10) as a conventional pillow case (10). One of the extremities of the pillow case (10) provides an opening wherein the pillow can be inserted. The back of the pillow case does not provide any specific designs in relation with tools, or objects participating in the program, it is left bland so to provide a flat surface as the one on a conventional sleeping pillow. Thus a child preferably lays or sits or even sleeps on this surface of the pillow case (10).

Figure 4:
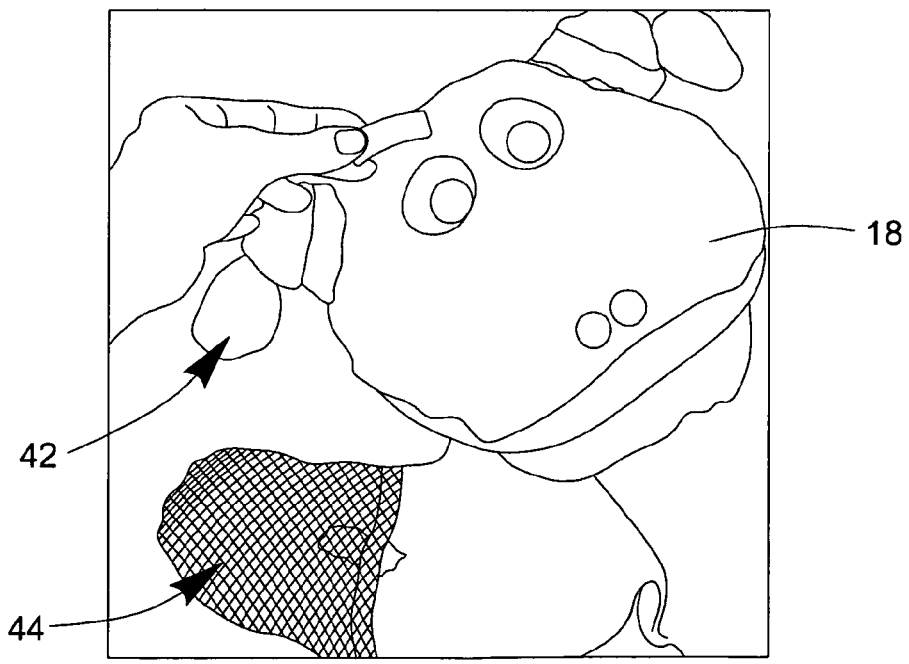
FIG. 4 is a partial view showing a face on the pillow case of FIG. 1.

The pillow case (12) comprises and a plurality of sets of detachable pieces. Referring to FIG. 4, there are shown accessories (42) that are used to decorate the pillow case. These accessories are preferably placed in the pockets (16) on the paws (44) of the animal when these accessories are not in use.

At least one of the plurality of pockets (16) and at least one set of detachable pieces enable receiving information for a program for raising children. The at least one set of detachable pieces is arranged for exposing and updating information on an evolution of a behavior.

Figure 5:
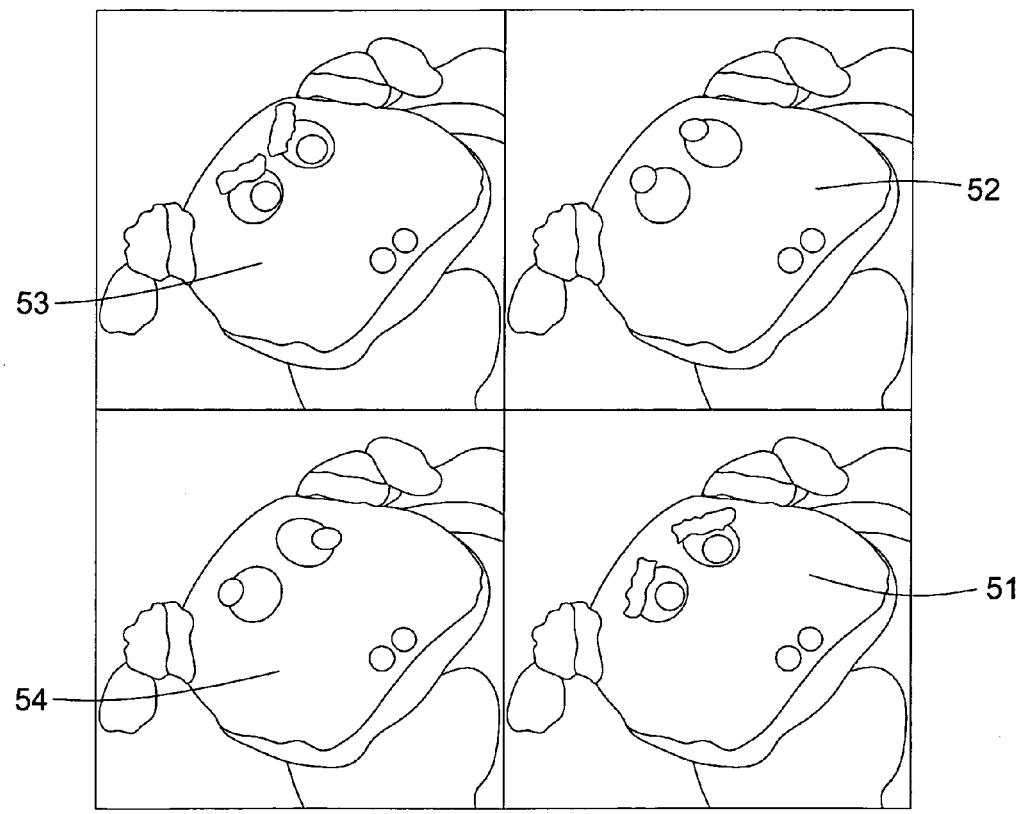
FIG. 5 are example of facial designs on the face of FIG. 4.

As the pillow case (10) according to the present embodiment of the invention has the appearance of a stuffed animal, it allows, for example, modifying the face (18) of the animal, as best shown in FIGS. 4 and 5. When using some of the pieces among the plurality of detachable pieces, the exterior surface is adjustable to portray emotions.

Referring to FIG. 5, there are shown some examples of the different facial expressions (51, 52, 53, and 54) that are preferably designed on the face (18) of the stuffed animal. Facial expressions are made using detachable pieces forming the eyes of the stuffed animal. In the industry of parenting tools, cartoons and toys, several facial expressions are symbolized by the position of the eyes and these positions are also associated with emotions and feelings such as happiness, sadness, dizziness and dreaminess.

Figure 6:
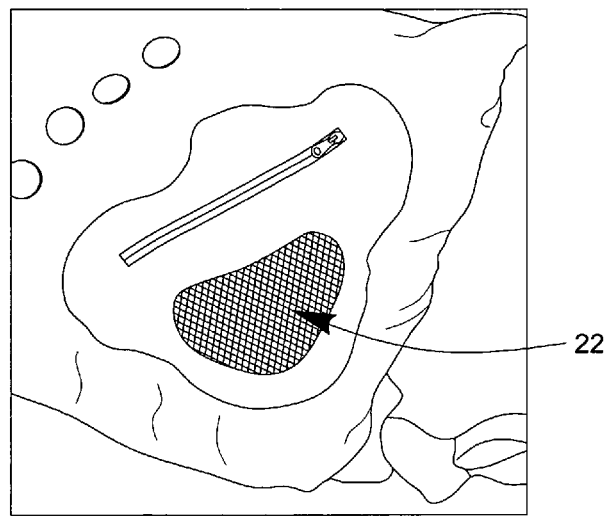
FIG. 6 is partial view showing a pocket of the pillow case of FIG. 1.

Referring to FIG. 6, there is provided a pocket (16) for displaying objects. This pocket (16) is made of a piece of transparent netting (22) to disclose the objects. This pocket is open and close using a zipper. It will be understood that various means can substitute to the present netting (22) and zipper system. For example transparent plastic films for use in the dress-making industry or translucent fabrics of the like are suitable for this pocket. It will be also understood that the object of the present pocket is to hold and display the items put inside the pocket, therefore other means for holding objects while partially disclosing the objects are also suitable, for example a retaining system using elastics or a partially closed pocket can also suit for holding an object while partially revealing the object.

Figure 7:
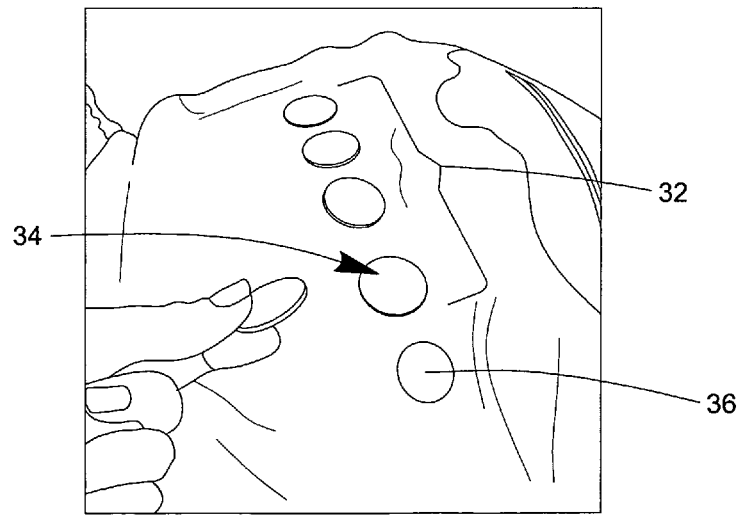
FIG. 7 is a partial view showing a set of detachable pieces of the pillow case of FIG. 1.

Referring to FIG. 7, it is shown a scale (32) according to the present invention, a set of about five small discs is provided. The discs (34) are cylinders of the shape of buttons or coins having a diameter of about one centimeter. Each disc (34) carries Velcro on one side; this Velcro is compatible with a complementary Velcro part on the pillow case (10). According to the child's (12) behavior evolution, the small discs can be added or removed from the pillow case. More generally, at least one of the pieces among the sets of detachable pieces of the pillow case is attachable to, or removable from, the pillow case (10) in order to increment, or decrement, a scale representing the evolution of the behavior. Having a scale enables observing progressively and keeping records of the child's improvement or regression. The scale system therefore allows a parent to notice the different steps of the improvement and to reward each step separately. It is also preferable to place all the discs (34) in a pocket (16) for example in a paw (44) of the stuffed animal.

To design such a pillow case (10), it is preferable to use a polyester fabric. This may lengthen the lifetime of the pillow case. Preferably, the head and the arms or paws of the animal are also made of polyester fibers. A person skilled in the art will understand that various fibers used in pillow and soft toy's making are also suitable.

The pillow case (10) according to the present invention is designed to support the parents in motivating their child to learning values such as discipline and perseverance. Therefore, the present invention provides a method for enhancing a program for raising a child. The method comprises the steps of providing to a child a pillow case (10) as described above. The method also comprises the steps of using the plurality of pockets (16) for carrying objects, at least one of the plurality of pockets (16) being located on the exterior surface and enabling the display of the objects, and at least another of the plurality of pockets (16) being located on the interior surface, and whereby the objects include messages, or objectives, or incentives, or rewards, or a combination thereof. The method also comprises the step of using the at least one set of detachable pieces for exposing and updating information on an evolution of a behavior.

The present invention provides a pillow case (10) that is easy to handle. However, it is preferable to proceed by using the following instructions:

1. inscribing the objective on an object placed in a pocket so that the objective is visible through the netting (22) of the pocket (16).
2. using the pocket (16) in the mouth (14) of the stuffed for placing incentives, information such as comments, feedbacks, ideas, drawings in the mouth (14) of the stuffed animal; modifying the patterns on the face (18) of the stuffed animal.
3. when willing to mark up an improvement or regression a child (12), adding or removing an attachable disc (34) on the stuffed animal; it will be understood by a person skilled in the art that this procedure can be accompanied with a dialogue between a parent and child, for example to explain to the child the steps of the program or congratulate the child.
4. when the top of the scale has been reached, that is to say all the discs have been attached on the stuffed animal, providing reward such as a gift to the child by placing the gift in the mouth of the stuffed animal.
5. restarting from point 1 as long as the objectives are not reached.
6. restarting with a new objective.

The present embodiment of the invention is based on the teachings of Albert Bandura regarding child development and social skills improvement. It will be understood that the present embodiment is not limited to such teachings and can serve as a tool in other parenting programs. It will be understood that the present invention is more suitable for programs involving a plan which a person is suppose to follow. The present invention will facilitate the follow ups by providing among other parts the described pockets and scales.

Considering that each family is different and has different schedules, the present invention has been conceived to adapt to different people and different environments, without consideration of the moment of use. Thus, the pockets (16) are used comparably to mail boxes, so parents can leave messages or notes anytime, for example, before their child (12) wakes up and the system also enables a child to pick up the message up anytime after, for example, during the afternoon while returning from school.

The pillow case according to the present invention can be carried from a bedroom to a leaving room or to a car. As the pillow case can be used in different places, the pillow case is not likely to be left aside in a wardrobe or in a closet. The pillow case according to the present invention can be used regardless of the objectives set by the parents. The pillow case according to the present invention can also be used for different child at the same time or on their turn. Thus, the present invention provides a tool for teaching teamwork and cooperation.

Even though the pillow case according to the present invention is preferably used in a home environment, it is also suggested to use this pillow case in a class room as a mascot. It will be understood by a person skilled in the art that it is preferable to develop another embodiment of the present invention for groups of children such as a class room, for example, a pillow case (10) of a bigger size with more pockets (16).

Although the present invention has been explained herein above by way of preferred embodiments thereof, it should be pointed out that various modifications can be made to these embodiments without departing from the scope of the claims.

What is claimed is:

1. A pillow case for enhancing a program for raising children, the pillow case comprising:
    an interior surface and an exterior surface, the interior surface providing at least one room for casing a pillow and the exterior surface having a shape of a stuffed toy;
    a plurality of pockets for carrying objects, at least one of the plurality of pockets being located on the exterior surface and enabling the display of the objects, and at least another of the plurality of pockets being located on the interior surface;
    said exterior surface being shaped and sized to resemble a stuffed animal and including at least a mouth area and an eye area;
    a plurality of sets of detachable pieces, at least one of said plurality of sets of detachable pieces forming the eves of the stuffed animal representing a plurality of facial expressions;
    wherein at least one of the plurality of pockets, and at least one set of detachable pieces enable receiving information for the program for raising children, whereby the objects include messages, or objectives, or incentives, or rewards, or a combination thereof, and whereby the at least one set of detachable pieces is arranged for exposing and updating information on an evolution of a behavior; and
    wherein a child uses said set of detachable pieces forming the eyes to convey an emotion.

2. The pillow case of claim 1, wherein at least one of the pieces among the at least one set of detachable pieces is attachable to, or removable from, the pillow case in order to increment, or decrement, a scale representing the evolution of the behavior.

3. The pillow case of claim 1, wherein, when using some of the pieces among the plurality of detachable pieces, the exterior surface is adjustable to portray emotions.

4. A method for enhancing a program for raising a child, the method comprising the steps of;
    providing a pillow case comprising an interior surface, and an exterior surface, and a plurality of pockets, said interior surface providing at least one room for casing a pillow and said exterior surface having a shape of a stuffed toy, and wherein at least one of the plurality of pockets, and at least one set of detachable pieces carry information for the program for raising children;
    providing a plurality of sets of detachable pieces, at least one of said plurality of sets of detachable pieces forming the eves of the stuffed animal representing a plurality of facial expressions;
    said exterior surface being shaped and sized to resemble a stuffed animal and including at least a mouth area and an eye area;
    using the plurality of pockets for carrying objects, at least one of the plurality of pockets being located on the exterior surface and enabling the display of the objects, and at least another of the plurality of pockets being located on the interior surface, and whereby the objects include messages, or objectives, or incentives, or rewards, or a combination thereof;

using the at least one set of detachable pieces for exposing and updating information on an evolution of a behavior; and using said sets of detachable pieces forming the eyes to convey an expression.

5. The method of claim 4, wherein at least one of the pieces among the at least one set of detachable pieces is attachable to, or removable from, the pillow case in order to increment, or decrement, a scale representing the evolution of the behavior.

6. The method of claim 4, wherein, when using some of the pieces among the plurality of detachable pieces, the exterior surface is adjustable to portray emotions.

7. The method of claim 4, further comprising the steps of:
inscribing a predetermined objective on at least one of the objects;
inserting the at least one object in the at least one pocket enabling to display objects so to display the objective.

* * * * *

UNITED STATES PATENT AND TRADEMARK OFFICE
CERTIFICATE OF CORRECTION

PATENT NO. : 7,722,357 B2  Page 1 of 1
APPLICATION NO. : 11/403688
DATED : May 25, 2010
INVENTOR(S) : Payette-Hebert et al.

It is certified that error appears in the above-identified patent and that said Letters Patent is hereby corrected as shown below:

Column 6, line 23 (Line 15 of Claim 1), after the word "the", change "eves" to --eyes--.
In Column 6, line 55 (Line 12 of Claim 4), after the word "the", (first occurrence) change "eves" to --eyes--.

Signed and Sealed this

Thirteenth Day of July, 2010

David J. Kappos
*Director of the United States Patent and Trademark Office*